United States Patent
Collin et al.

(10) Patent No.: US 9,928,928 B2
(45) Date of Patent: Mar. 27, 2018

(54) PACKAGING FOR TRANSPORTING AND/OR STORING RADIOACTIVE MATERIAL, COMPRISING A MORE EFFECTIVE CORNER SHOCK ABSORBER

(71) Applicant: TN INTERNATIONAL, Montigny le Bretonneux (FR)

(72) Inventors: Fabien Collin, Elancourt (FR); Hugo Androdias, Versailles (FR); Hervé Ripert, Paris (FR); Aude Tignat, Guyancourt (FR)

(73) Assignee: TN INTERNATIONAL, Montigny le Bretonneux (FR)

( * ) Notice: Subject to any disclaimer, the term of this patent is extended or adjusted under 35 U.S.C. 154(b) by 0 days.

(21) Appl. No.: 15/305,842

(22) PCT Filed: Apr. 17, 2015

(86) PCT No.: PCT/EP2015/058414
§ 371 (c)(1),
(2) Date: Oct. 21, 2016

(87) PCT Pub. No.: WO2015/162065
PCT Pub. Date: Oct. 29, 2015

(65) Prior Publication Data
US 2017/0047134 A1 Feb. 16, 2017

(30) Foreign Application Priority Data
Apr. 22, 2014 (FR) ...................................... 14 53588

(51) Int. Cl.
*G21F 5/08* (2006.01)
*G21F 5/015* (2006.01)
(Continued)

(52) U.S. Cl.
CPC ............. *G21F 5/08* (2013.01); *B65D 81/054* (2013.01); *B65D 81/107* (2013.01); *B65D 85/70* (2013.01); *F16F 7/121* (2013.01); *G21F 5/015* (2013.01)

(58) Field of Classification Search
CPC ..... G21F 1/00; G21F 1/02; G21F 1/12; G21F 3/00; G21F 5/00; G21F 5/002;
(Continued)

(56) References Cited

U.S. PATENT DOCUMENTS 4,810,890 A * 3/1989 Blum .................. G21F 5/08
250/506.1
4,972,087 A * 11/1990 Neider ................ G21F 5/08
250/507.1
(Continued)

FOREIGN PATENT DOCUMENTS

| FR | 2 487 565 A1 | 1/1982 |
| FR | 2 971 615 A1 | 8/2012 |

(Continued)

OTHER PUBLICATIONS

International Search Report issued in Application No. PCT/EP2015/058414 dated Jun. 30, 2015.
(Continued)

*Primary Examiner* — Nicole Ippolito
(74) *Attorney, Agent, or Firm* — Pearne & Gordon LLP

(57) ABSTRACT

Packaging for transporting and/or storing radioactive material, comprising a packaging body which defines therein a cavity for housing radioactive material, and at least one shock absorber which is mounted on the outside of the packaging body, which has an outer surface provided with at least one first outer surface and one second outer surface which are separated by an edge that is covered by the shock absorber. The absorber comprises a metal damping structure (Continued)

comprising a first recess having an imaginary straight line extending therethrough, the line passing through both a center of gravity of the packaging and a point on the edge, a second recess arranged so as to face one of the outer surfaces, and a metal wall for absorbing shocks by plastic deformation. The wall is at least 5 mm thick and defines the first and second recesses on either side thereof.

15 Claims, 5 Drawing Sheets

(51) Int. Cl.
  *F16F 7/12* (2006.01)
  *B65D 81/05* (2006.01)
  *B65D 81/107* (2006.01)
  *B65D 85/00* (2006.01)
(58) Field of Classification Search
  CPC ... G21F 5/005; G21F 5/02; G21F 5/06; G21F 5/08; G21F 5/12
  USPC ............... 250/505.1, 506.1, 515.1, 518.1
  See application file for complete search history.

(56) References Cited

U.S. PATENT DOCUMENTS

| | | | |
|---|---|---|---|
| 5,175,041 A | 12/1992 | Webb | |
| 6,234,311 B1* | 5/2001 | Francois | G21F 5/08 |
| | | | 206/521 |
| 6,280,127 B1* | 8/2001 | Spilker | B60P 7/18 |
| | | | 410/120 |
| 2014/0035196 A1* | 2/2014 | Ripert | F28F 3/00 |
| | | | 264/267 |

FOREIGN PATENT DOCUMENTS

| | | |
|---|---|---|
| GB | 1 480 742 A | 7/1977 |
| JP | 2005-321304 A | 11/2005 |

OTHER PUBLICATIONS

Search Report issued in French Patent Application No. FR 14 53588 dated Dec. 10, 2014.
Written Opinion issued in Application No. PCT/EP2015/058414 dated Jun. 30, 2015.

* cited by examiner

PACKAGING FOR TRANSPORTING AND/OR STORING RADIOACTIVE MATERIAL, COMPRISING A MORE EFFECTIVE CORNER SHOCK ABSORBER

TECHNICAL FIELD

This invention relates to the field of packaging for transporting and/or storing radioactive material, such as radioactive waste or unspent or spent nuclear fuel assemblies. It more particularly relates to shock absorbers fitting out the packaging body, and more specifically to shock absorbers covering the edges defined on the outer surface of said packaging body.

PRIOR ART

A package for storing and/or transporting radioactive material generally comprises, as an outer envelope, a packaging including a packaging body. The latter, formed from a side body, a bottom and a lid, defines a cavity for housing an assembly containing radioactive material, for example a rack housing nuclear fuel assemblies or waste canisters.

The safety demonstration of the packaging loaded with radioactive material is in particular based on regulatory drop testing, such as a fall from a height of 9 meters. In order to fulfil these requirements, the plastic deformations of the packaging body are designed to be limited, in order to guarantee the airtightness of the cavity housing the radioactive material.

In order to guarantee the airtightness of the containment system formed by the packaging body, the latter is usually provided with a plurality of shock absorbers. Given that the most disadvantageous drop directions are those corresponding to the imaginary straight lines passing through a centre of gravity of the packaging and through the points on the edges present on the outer surface of the packaging body, shock absorbers are arranged such that they partially cover said edges. This in particular involves corner shock absorbers, each positioned so as to cover one or more convergent edges.

Several solutions have been proposed in the prior art, such as in documents FR 2 971 615 and GB 1 480 742 disclosing corner shock absorbers each covering a plurality of convergent edges. Nonetheless, these shock absorbers are subject to degradation risks from the edges in the event of a fall, and are therefore capable of providing reduced efficiency if they cannot become suitably deformed to absorb a sufficient amount of energy. In order to overcome this problem, wooden shock absorbers can be implemented, with a sufficiently large volume to mitigate any risks of possible damage thereto from the edges. However, in this example, the large overall dimensions of the packaging can be incompatible with the operating restrictions.

SUMMARY OF THE INVENTION

The purpose of the invention is therefore to at least partially overcome the aforementioned drawbacks regarding the productions of the prior art.

To achieve this, the invention relates to a packaging as defined in claim 1.

Advantageously, the use of a metal material to produce the shock absorbing wall results in the reduced overall dimensions of the shock absorber, in particular when compared to known wooden solutions, having lower crushing stresses. The invention thus proves to be more easily compatible with the operating restrictions, which are becoming increasingly strict.

Moreover, the presence of the first recess opposite the edge prevents the direct transmission of loads to this edge, in the event of a fall oriented in the direction of the aforementioned imaginary straight line. This preserves the edge, which constitutes a particularly sensitive area of the packaging body. However this above all limits the risks of the edge damaging the shock absorber, the latter therefore better performing its main function of absorbing the fall energy, i.e. limiting the accelerations suffered by the packaging.

Moreover, it should be noted that by providing the second recess adjacent to the first recess, said metal wall is defined and is at least 5 mm thick, forming an energy absorption element absorbing energy by means of plastic deformation. Such a wall is more likely to become plastically deformed than a block of material, and therefore allows the desired energy to be absorbed, even with materials having high crushing stresses, general synonymous of small dimensions. Thanks to the deformation of the wall, the packaging body is mechanically solicited to a lesser extent, resulting in the improved protection thereof. Furthermore, as stated hereinabove, the improvement in the protection of the packaging also originates from the fact that the metal wall intended to become deformed to absorb the energy does not transmit loads directly to the sensitive edge, but instead transmits loads to that of the first and second outer surfaces of the body opposite which the second recess and the metal wall are located. The risks of the edge damaging the shock absorber are therefore considerably reduced, and this shock absorber can therefore benefit from improved efficiency, while having reduced dimensions.

Moreover, the invention relates to a shock absorber having:

a first part opposite said first outer surface of the packaging body;

a second part opposite said second outer surface of the packaging body, the second part being separated from the first part by said first recess;

this shock absorber further has, associated with at least one of said first and second parts, anti-sliding means enabling, in the event of a fall on the shock absorber, said at least one of the first and second parts to be held in relation to its associated outer surface of the packaging body, in a direction distancing it from the edge. These anti-sliding means can be produced in different manners, for example using abutments in the form of pins or bolts, etc.

This specificity prevents/limits the relative sliding between the packaging body and the shock absorber in the plane of the interface, in the event of a fall with a loading direction such that the edge would tend to tear the shock absorber. The risk of such a tear is therefore reduced thanks to the prevented/limited sliding of the outer surface of the packaging body relative to the part of the shock absorber opposite thereto, in the direction distancing the latter surface from the edge. The limiting of this sliding encourages the loading of the metal shock absorbing wall separating the two recesses, which can thus become deformed in order to better absorb the impact energy in the event of a fall. The airtightness of the confinement system is therefore better preserved.

Preferably, the anti-sliding means associated with the first and/or second part of the shock absorber extend over a length, according to the direction of the edge, representing 70 to 100% of the length of said metal wall along said direction. In this regard, it should be noted that a parallelism is not necessary preserved between the metal wall, the edge and the anti-sliding means. The significant length according to which these anti-sliding means extend, strengthens their first function, and thus limits to a better degree the risks of the shock absorber becoming torn by the edge.

Preferably, at least one of said first and second outer surfaces of the packaging body has a level break between two portions of this outer surface, said level break being oriented towards said edge, said part of the shock absorber, opposite said outer surface including the level break, comprises a holding surface for holding the shock absorber, cooperating with said level break, and the level break and the holding surface form said anti-sliding means.

The elements implemented provide for a surface cooperation between the shock absorber and the packaging body, which further increases the anti-sliding function in the event of a fall with a loading direction such that the edge would tend to tear the shock absorber. It should be noted that for each part of the shock absorber, the anti-sliding means can be located at any point of the interface between this part of the shock absorber and its associated outer surface of the packaging body. For example, they can be located substantially in the centre of this interface, at the end of the shock absorber part, or at any point between the latter two positions.

Moreover, it should be noted that the level break and its associated holding surface are produced via machining on their respective elements, or are obtained via the assembly of a plurality of parts.

Moreover, it should be noted that the level break is locally orthogonal to the outer surface that it defines, or inclined relative to the normal to this outer surface of the packaging body.

Preferably, said wall is made from steel, more preferably from stainless steel. This provides the benefits of a high crushing stress, advantageously preserved for heavy packages. Therefore, the dimensions of such a steel wall can be reduced, in particular its thickness and/or its length, while allowing for satisfactory energy absorption. In this respect, it should be noted that the use of steel has been made possible by the principle of deforming a wall, as opposed to deforming a solid block. Nonetheless, in particular for lighter packages, other metal materials can be used, such as aluminium and its alloys.

Preferably, said metal wall is substantially parallel to the edge, even if, alternatively, an incline can be provided for, without leaving the scope of the invention.

Preferably, at least one of the first and second recesses is passed through by at least one stiffening rib, connected to said metal wall.

Preferably, the stiffening rib(s) arranged in the first recess and the stiffening rib(s) arranged in the second recess are arranged in different planes, preferably in staggered rows.

Preferably, the stiffening rib(s) arranged in the first recess and the stiffening rib(s) arranged in the second recess are arranged substantially orthogonally to the metal wall.

Preferably, the packaging is designed such that said metal wall is not passed through by the imaginary surface defined by all of the imaginary straight lines passing through the edge and through the centre of gravity of the packaging. The efficiency of the invention is therefore further improved.

Preferably, the packaging is designed such that said recesses, with the possible exception of the presence of stiffening ribs, are left empty. Alternatively, these recesses could be filled, for example, at least partially with a filler material, having a very low crushing stress compared to that of the metal material used for the damping structure. In tangible terms, no damping function would be attached to this optional filler material, the function of which would instead consist in limiting the water retention areas or in easing decontamination of the shock absorber. Moreover, it is specified that the use of such a damping material can be provided for in association with said stiffening ribs, i.e. this material can at least partially fill the part of said recesses not occupied by said stiffening ribs.

Preferably, said shock absorber is mounted in a removable manner onto the packaging body, for example using shear pins and bolts. The term 'mounted in a removable manner' is understood as meaning that the fixing means used have a reversible character.

Preferably, the shock absorber is a protection structure covering one corner of the packaging body, defined by at least three convergent edges of the outer surface of this body. Furthermore, the shock absorber is advantageously provided with means specific to the invention, enabling each of the three edges to be protected in the aforementioned manner.

Preferably, the packaging comprises a plurality of individual shock absorbers, each covering one corner of the outer surface of the packaging body.

Preferably, the packaging body has a generally polyhedral shape, for example a cylindrical shape with a polygonal cross-section, such as a square, a rectangle or a hexagon, etc.

Other advantages and characteristics of the invention shall be observed in the following detailed description of the invention, which is not intended to limit the invention.

BRIEF DESCRIPTION OF THE FIGURES

This description will be made with reference to the appended figures, wherein.

DETAILED DESCRIPTION OF THE SPECIFIC EMBODIMENTS

Figure 1:
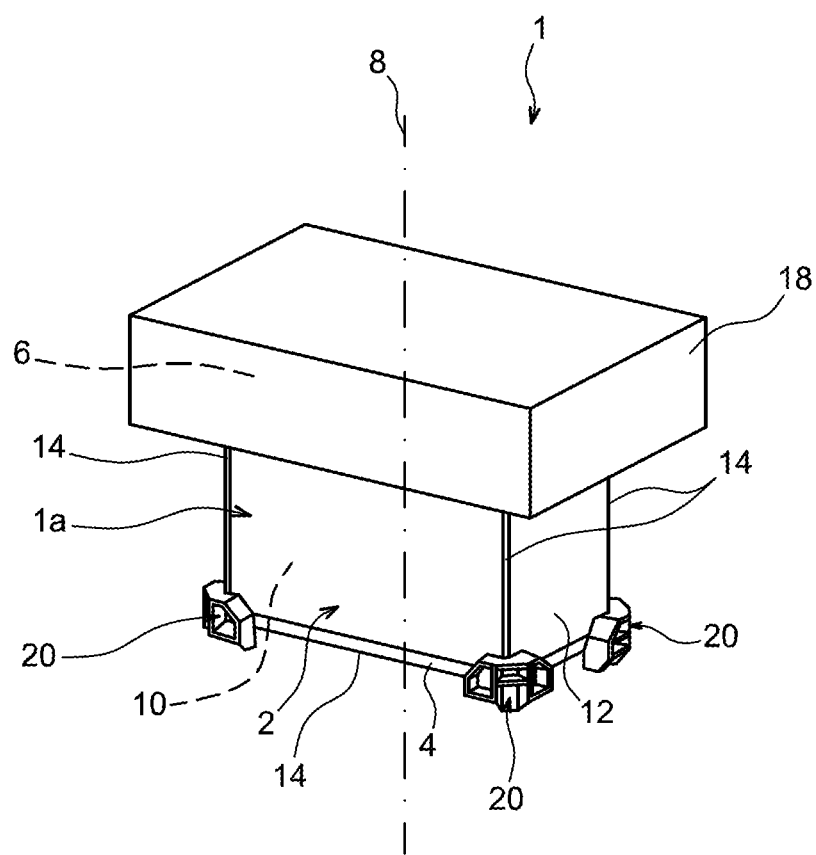
FIG. 1 shows a perspective view of a packaging for transporting and/or storing radioactive material, according to one preferred embodiment of this invention.

Reference is firstly made to FIG. 1, which shows a packaging 1 for storing and/or transporting radioactive material in the form of one preferred embodiment of the invention.

The packaging 1 comprises a packaging body 1a equipped with a side body 2, a bottom 4 and a lid 6 closing an opening of the packaging opposite the bottom 4. The packaging has a longitudinal axis 8 centred in relation to the side body 2, and passing through the lid as well as the bottom of this packaging. In a known manner, the packaging body 1a forms an outer envelope defining a cavity 10 used to house the radioactive material (not illustrated). The cavity 10 is an enclosure inside of which this radioactive material is confined, whereby said radioactive material can be irradiated metal parts or spent nuclear fuel assemblies, etc. The packaging 1 and the radioactive material confined within the cavity 10 together form a package.

The packaging body 1a has a generally polyhedral shape. In the embodiment illustrated, this has a cylindrical shape with an axis 8 and a rectangular cross-section. Regardless of the shape adopted, the outer surface 12 of the packaging body 1a has edges 14 between the different sides. Shock absorbers 18, 20 are arranged at the level of these edges. These shock absorbers are provided so as to guarantee the airtightness of the confinement system formed by the packaging body in the event that the packaging suffers a fall. More specifically, this firstly involves a shock absorbing cap 18 comprising wood as the shock absorbing material, and covering the whole upper end of the packaging body 1a. The term upper end shall be understood herein as the top end of the packaging body when the latter is located in the position for transport and/or storage as shown in FIG. 1, i.e. wherein the lid 6 is located directly above the bottom 4. This wooden cap therefore covers the four upper edges of the body 1a, together forming the rectangular cross-section of the body. Its design is classic and known by one of ordinary skill in the art, and will not therefore be described further.

However, at the level of the lower end of the packaging body 1a, the packaging 1 is equipped with a plurality of individual shock absorbers 20, i.e. independent and spaced apart from each other, each mounted on a corner of the polyhedral shape. Therefore, four shock absorbers 20 are provided, specific to the invention, each covering one corner of the lower end of the body 1a. In this respect, it should be noted that each corner is formed by three edge 14 portions that converge at the same point.

The design of these individual shock absorbers 20 will be described hereinbelow. Nonetheless, it should be noted that the invention further applies to shock absorbers designed to cover a single edge or edge portion, as is the case for the embodiments illustrated in FIGS. 2 to 7. In this scenario, the shock absorbers concerned could not only be located at the level of the lower end of the body 1a, but also at the level of its upper end, and/or at any level along the edges 14 of the side body 2. Similarly, the corner shock absorbers 20 illustrated in FIG. 1 could also equip the upper end of the packaging body 1a, replacing the shock absorbing cap 18, without leaving the scope of the invention.

Figure 2:
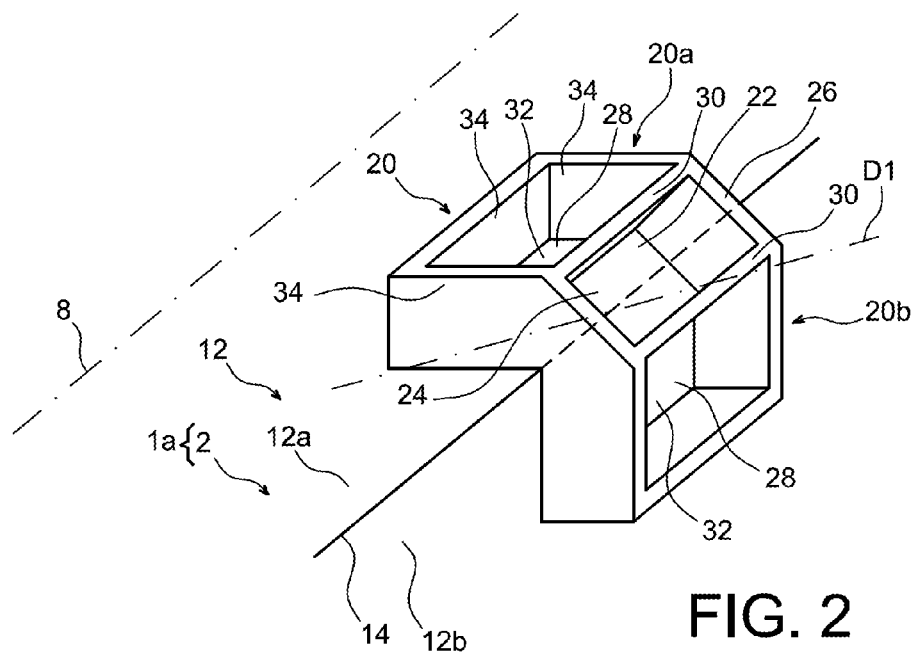
FIG. 2 shows a detailed perspective view of a shock absorber capable of equipping the packaging illustrated in FIG. 1.
Figure 3:
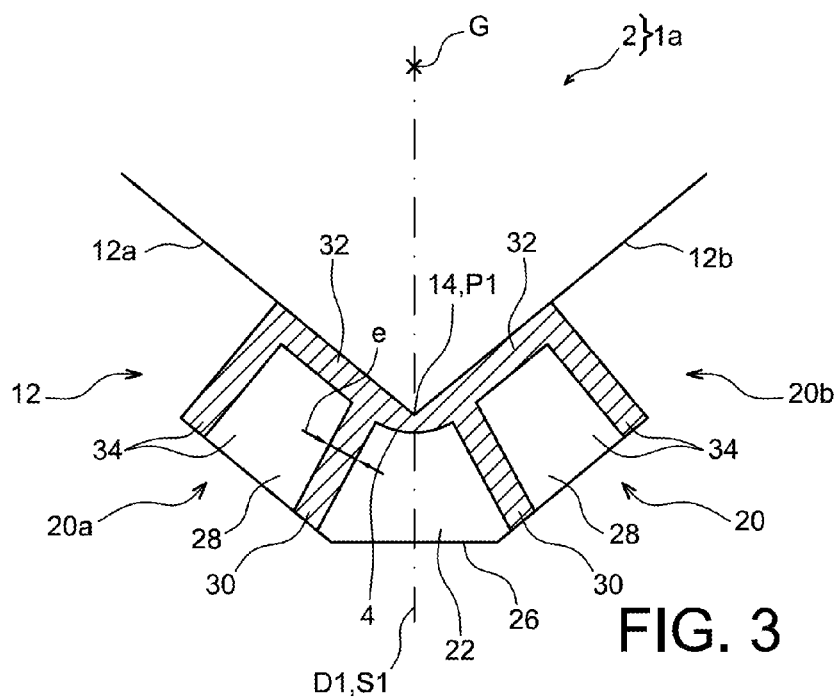
FIG. 3 shows a cross-sectional view of the shock absorber illustrated in the previous figure.

FIGS. 2 and 3 show a first example embodiment of the shock absorber 20. In this example, the shock absorber 20 covers a part of one of the edges 14 of the side body 2, parallel to the axis 8. This edge separates two portions of the outer surface 12 of the side body 2, hereinafter referred to as the first outer surface 12a and second outer surface 12b. In tangible terms, these are two planar, adjacent faces, delimited in part by the edge 14 concerned. The part of the edge covered by the shock absorber 20 represents less than 40% of the length of the edge.

Although not illustrated, the shock absorber 20 is mounted in a removable manner onto the packaging body 1a, for example using shear pins and bolts. These reversible fixing elements are preferably arranged orthogonally to the surfaces 12a, 12b. Their removable character enables the shock absorbers to be removed when the latter are no longer required, for example in the storage configuration.

The shock absorber 20 comprises two parts secured to each other, for example formed in one piece from a solid block, and said first part 20a and second part 20b respectively. The first part 20a covers a portion of the first surface 12a, whereas the second part 20b of the shock absorber covers a portion of the second surface 12b. Between the two parts 20a, 20b of the shock absorber, a first recess 22 is provided to the right of the edge 14. This first recess 22 is passed through by an imaginary straight line D1 passing via a centre of gravity G of the packaging, and via a point P1 of the edge 14. More generally, this first recess 22 is passed through by the imaginary surface S1 defined by all of the imaginary straight lines passing via the edge 14 and via the centre of gravity G of the packaging.

At the level of this first recess 22 located at the junction between the two parts 20a, 20b of the shock absorber, the latter only has a material ligament 24 taking on the edge 14. In the outwards direction towards the imaginary straight line D1, from the ligament 24, the shock absorber remains completely empty. It opens out onto an end surface 26 which forms the contour of the recess 22 and which preferably takes on the shape of a planar surface orthogonal to the imaginary surface S1. Moreover, this end surface 26 is considered to be bevelled, because it forms an angle of approximately 45° with each of the two surfaces 12a, 12b substantially orthogonal to each other. It also forms an angle of approximately 45° with the outer surface of each of the two parts 20a, 20b of the shock absorber. In the embodiment illustrated, these parts 20a, 20b are substantially symmetrical with respect to the imaginary surface S1. Therefore, the detailed description shall only be made of the first part 20a, whereby the second part 20b must be considered to be of the same or similar design. In particular, if they are not identical, these parts 20a, 20b can have different dimensions.

The first part 20a of the shock absorber 20 has a second recess 28, arranged facing the first outer surface 12a. This second recess 28 is separated from the first recess 22 by a metal wall 30 specific to the invention. This wall 30, parallel to the edge 14, extends towards the outside of the body 1a from a bottom 32 of the first part 20a, pressed against the surface 12a. The wall 30 therefore delimits the first and second recesses 22, 28, by having a thickness "e" greater than 5 mm, and preferably between 10 and 50 mm.

The contour of the recess 28 is also delimited by peripheral walls 34 also extending outwards from the bottom 32. The four walls 30, 32 thus delimit a recess 28 having a substantially parallelepipedal shape, which remains completely empty. It opens out onto an outer surface of the first part 20a of the shock absorber, parallel to the outer surface 12a of the side body 2.

The metal wall 30 is arranged so as not to be passed through by the imaginary surface S1, as illustrated in FIG. 3. Furthermore, in the event that the packaging suffers a fall along any one of the imaginary straight lines constituting this surface S1, the metal wall 30 is designed to dampen this fall by undergoing plastic deformation, without directly applying a load to the displaced edge 14 of this wall 30. In other words, the presence of the recess 22 facing the edge 14 prevents the direct transmission of significant loads to this edge, and thus limits the plastic deformations of this sensitive area. Indeed, this limits the risks of the edge 14 damaging the shock absorber in the event of a fall, since the counter-reaction of the edge on the latter remains low. The shock absorber 20 can thus better perform its main function of absorbing the fall energy by the plastic deformation of the two walls 30 of the parts 20a, 20b, and thus suitably limit the accelerations experienced by the packaging.

The two walls 30 are symmetrical in relation to the imaginary surface S1. The recesses 22, 28 located on either side of these walls allow for the deformation of the latter, mainly by crushing/compression along the direction of their height. As with all of the elements of the two parts 20a, 20b of the shock absorber, the walls 30 are preferably made from stainless steel, with a crushing stress of about 200 MPa. This high stress, associated with the adapted thickness and height of the walls 30, allows for a satisfactory level of energy absorption. In this respect, the ratio between the thickness and the height of the walls 30 is advantageously greater than 0.5.

As indicated above, the recesses 22, 28 are advantageously left empty. Nonetheless, a filler material can fill all or part of these recesses, for example in order to ease the decontamination of the shock absorber. This filler material would therefore complete the two parts 20a, 20b forming the damping structure of the shock absorber, advantageously made in one piece from a solid block of steel or from any other metal material considered to be appropriate according to the total mass of the packaging to be dampened. Nonetheless, this material is advantageously chosen with a crushing stress low enough to perform no shock absorbing function in the event that the packaging suffers a fall, or only a negligible shock absorbing function, and especially in such a way as to not interfere with the crushing of the adjacent walls 30, designed to absorb the fall energy by plastic deformation. In this regard, it should be noted that the ratio between the crushing stress of the material used for the metal damping structure and the crushing stress of the filler material, is preferably greater than 30, and more preferentially greater than 50. This is particularly the case for the combined use of steel and a foam.

Figure 4:
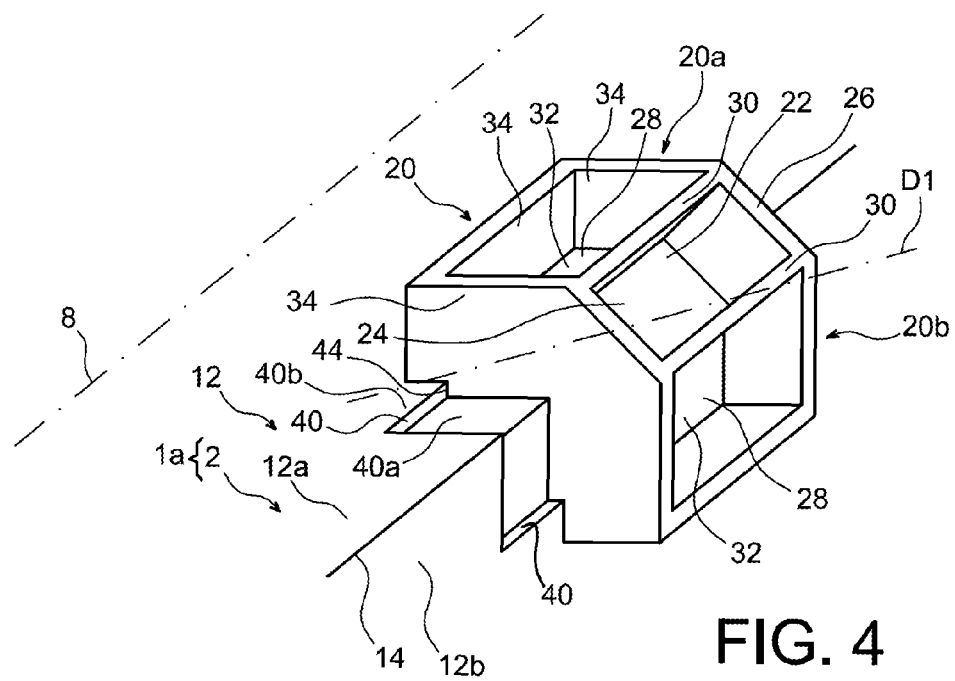
FIG. 4 shows a perspective view similar to that in FIG. 2, wherein the shock absorber is presented according to an alternative embodiment.

FIG. 4 shows another example embodiment of the shock absorber 20 and the outer surface 12 of the side body 2. The only difference with the previous embodiment lies in the design of the interface between the first and second parts 20a, 20b and their respective outer surfaces 12a, 12b. Indeed, anti-sliding means are provided for herein, in order to further limit the risk of the edge 14 tearing the shock absorber 20. For this purpose, identical or similar anti-sliding means are provided on each of the two parts 20a, 20b of the shock absorber. Therefore, only those attached to the first part 20a will be described hereinbelow.

Figure 4A:
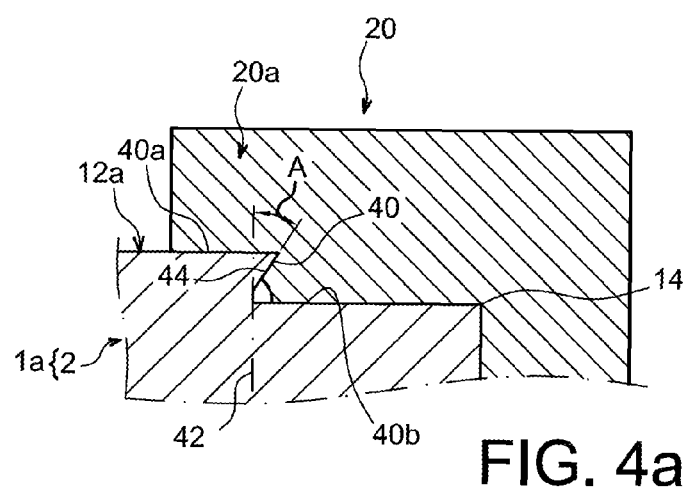
FIG. 4a is a cross-sectional view of one part of the shock absorber and of the packaging body illustrated in the previous figure, with a slight design modification.
Figure 5:
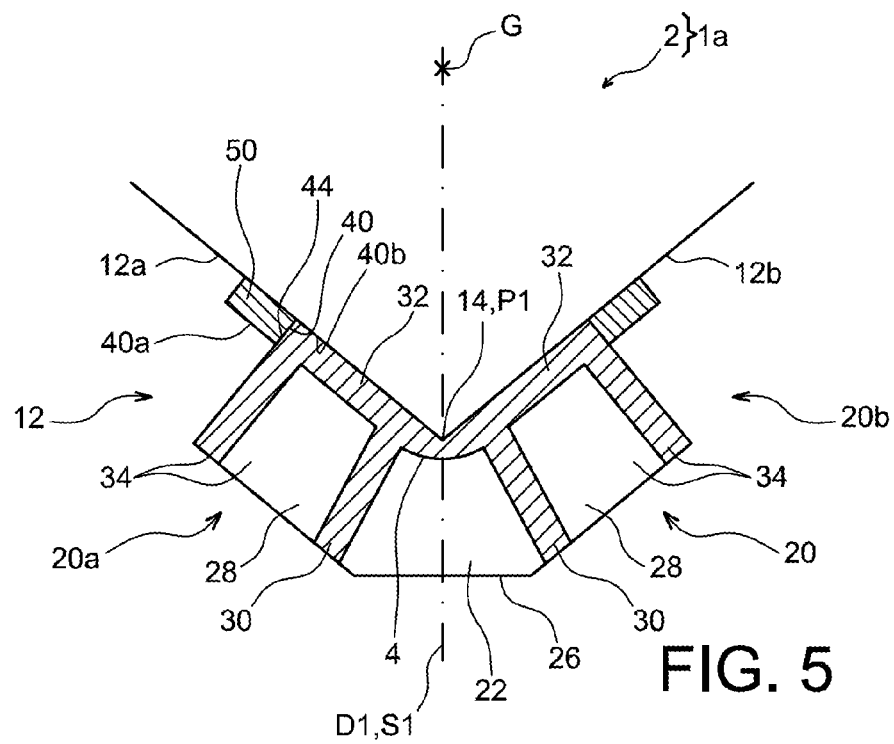
FIG. 5 shows a cross-sectional view similar to that in FIG. 3, wherein the shock absorber is presented according to another alternative embodiment.

As mentioned hereinabove, the anti-sliding means are designed in such a way that in the event of a fall on the shock absorber 20 according to the direction of the imaginary straight line D1, they hold the first part 20a in relation to its associated outer surface 12a, in a direction distancing this part 20a from the edge 14. For this purpose, the first outer surface 12a has a level break 40, such as a riser, between two portions 40a, 40b of this outer surface. The level break 40, made locally at the level of the shock absorber 20, is oriented towards the edge 14, for example by being locally orthogonal to the first outer surface 12 which defines it. In other words, the level break 40 is therefore orthogonal to the two portions 40a, 40b that it separates. This example is illustrated in FIG. 4. Nonetheless, the level break 40 could, locally, be inclined in relation to the normal 42 to this surface 12a, for example by an angle "A" between 5 and 45°, as illustrated in FIG. 4a.

Regardless of the chosen configuration for this level break 40, which in this case is parallel to the edge 14 and to the axis 8, this break is associated with a holding surface 44 made on the part 20a of the shock absorber. Together, the break 40 and the holding surface 44 form the anti-sliding means of the part 20a, by being in surface contact, preferably over the entire length of the wall 30 in the direction of the edge 14, i.e. over the entire length of the part 20a of the shock absorber.

In the event of a fall with a loading direction such that the edge 14 would tend to tear the shock absorber into two parts, the surface cooperation between the complementary surfaces 40, 44 limits the possible relative sliding between the part 20a and the side body 2, in the plane of the interface between these two elements. By reducing the risk of such tearing, the loading of the wall 30 is encouraged, the latter thus being able to deform as much as possible to absorb the impact energy.

These anti-sliding means can be provided at any point at the interface between the part 20a and the side body 2. They are slightly decentred in the embodiment in FIG. 4, or located at one end as illustrated in the example in FIG. 5. In the latter example, the inner surface of the bottom 32 of the part 20a remains planar, and its holding surface 44 is formed at its end, in the extension of the peripheral wall 34. The level break 40 is itself defined by the addition of a member 50 in the form of a bar on the first surface 12a, also remaining planar, at least locally. This solution thus contrasts with that of FIG. 4, wherein the anti-sliding means 40, 44 are made by machining on the outer surface 12a and on the inner surface of the bottom 32 of the shock absorber.

Figure 6:
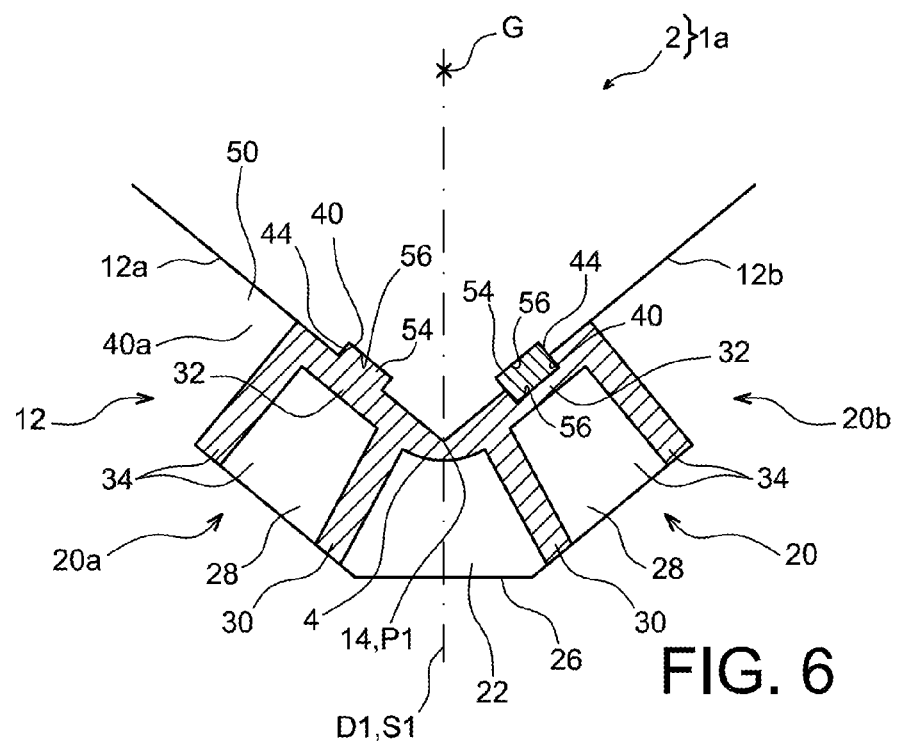
FIG. 6 shows a cross-sectional view similar to that in FIG. 3, wherein the shock absorber is presented according to a further alternative embodiment.

In another example embodiment shown in FIG. 6, other designs are illustrated for the anti-sliding means. For the part 20a, the bottom 32 has a bar 54 protruding inwards, preferably obtained by machining the bottom 32 on either side of this bar 54. This preferably has a rectangular cross-section. It is inserted into a groove having a complementary shape 56, provided on the surface 12a, and also travelling parallel to the edge 14. A sidewall of the groove 56 and a sidewall of the bar 54, which are in surface contact with each other, respectively form the level break 40 and the holding surface 44. These are the sidewalls located the furthest from the edge 14. The surface cooperation of opposite sidewalls prevents the ejection of the shock absorber, in particular during the regulatory drop test onto a punch.

For the part 20b, the design of the anti-sliding means is on a whole the same, whereby the only difference resides in the positioning of a bar 54 in two opposite grooves 56, respectively made on the surface 12b and the inner surface of the bottom 32. Again, a sidewall of the groove 56 made on the surface 12b, and a sidewall of the bar 54, respectively form the level break 40 and the holding surface 44. These are the sidewalls located the furthest from the edge 14. The surface cooperation of opposite sidewalls further prevents the ejection of the shock absorber. For the purposes of illustration, the bar 54 is mounted such that it is screwed onto the bottom 32 of the part 20b of the shock absorber, and only slid into the other groove 56 of the side body 2. Alternatively, the bar 54 can be mounted in the groove 56 of the side body 2 and slid into the groove 56 of the shock absorber, without leaving the scope of the invention.

Figure 7:
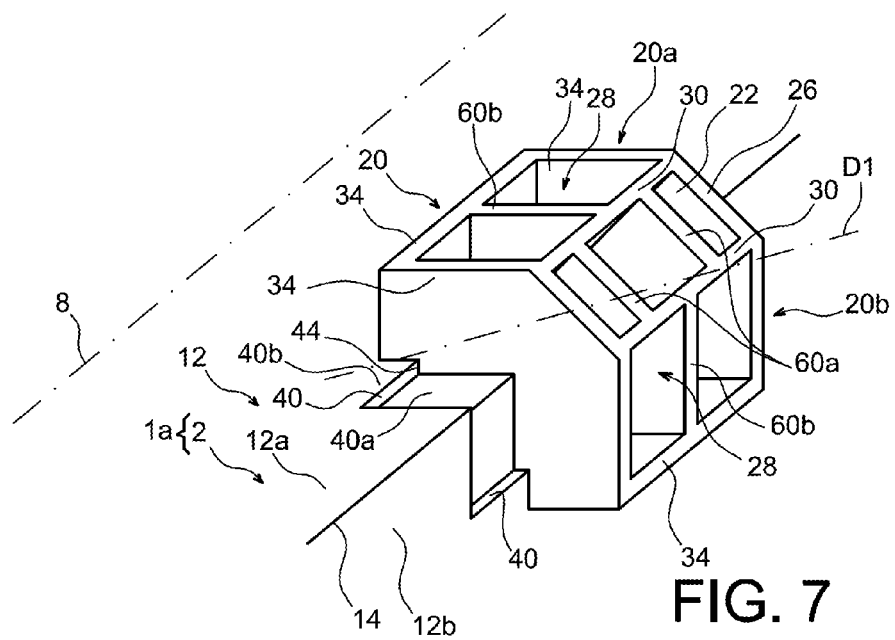
FIG. 7 shows a perspective view similar to that in FIG. 2, wherein the shock absorber is presented according to a further alternative embodiment.

FIG. 7 illustrates another alternative embodiment of the shock absorber 20, which can potentially be combined with the previous embodiments.

The first and second recesses 22, 28 are in this case passed through by stiffening ribs 60a, 60b, connecting to each other on the damping wall 30. These ribs are preferably made in one piece with the rest of the damping structure 20a, 20b. They have a height and a thickness that are less than or equal to those of the walls 30. For illustration purposes, the first recess 22 is equipped with two ribs 60a, arranged substantially orthogonally to two walls 30, to which their ends are connected. Each second recess 28 has a single rib 60b, also arranged substantially orthogonally to the wall 30 to which it connects via one of its two ends. The other end of the rib 60b is connected to the peripheral wall 34 parallel to the wall 30 concerned. The stiffening ribs 60a, 60b are thus arranged in planes that are orthogonal to the imaginary surface S1.

It is ensured that these ribs 60a, 60b are regularly distributed within their recesses 22, 28, and that the ribs 60a are arranged in different planes to those of the ribs 60b. An arrangement in staggered rows is preferred, as illustrated in FIG. 7.

Regardless of the arrangement selected, 75 to 95% of the section of each recess 22, 28 orthogonal to the walls and ribs is empty, the remainder corresponding to the space occupied by the stiffening ribs 60a, 60b.

In the event of a fall, these ribs maintain the orientation of the walls 30 so that they can become deformed more by crushing than by bending, for improved efficiency. Furthermore, the crushing of the ribs, also according to the direction of their height, further participates in absorbing energy in the event of a fall. In this regard, it should be noted that the walls 30 are also used to maintain the orientation of the ribs 60a, 60b, to prevent them from bending instead of crushing.

Figure 8:
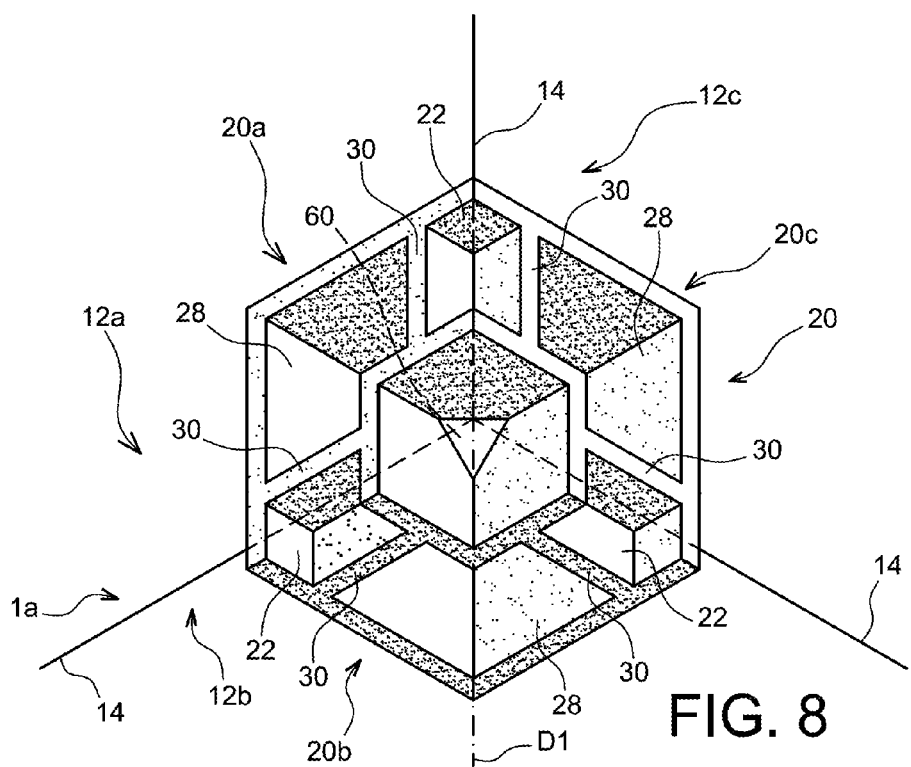
FIG. 8 shows an enlarged perspective view of one of the corner shock absorbers equipping the packaging illustrated in FIG. 1.

Finally, FIG. 8 shows an example embodiment of a corner shock absorber 20 intended to cover a corner 60 of the packaging body 1a. Instead of protecting two sides separated by an edge, this shock absorber 20 protects three sides 12a, 12b, 12c separated by three edges 14 which converge at one point. In this case, the three sides are orthogonal to each other.

The shock absorber 20 therefore comprises a damping structure with three parts 20a, 20b, 20c, each of an identical or similar design to that of the parts 20a, 20b of the shock absorber described with reference to FIGS. 2 to 7. Moreover, each part 20a, 20b, 20c has at least one damping wall 30 decentred from its associated edge 14, each wall 30 delimiting, on either side of the latter, a first recess 22 as well as a second recess 28. Nonetheless, on this shock absorber, the principle specific to the invention could be applied to only one or two edges among the three edges forming the corner 60, without leaving the scope of the invention.

Of course, various changes can be made to the invention by those skilled in the art, said invention being described hereinabove by way of non-limiting examples.

What is claimed is:

1. Packaging (1) for transporting and/or storing radioactive material comprising a packaging body (1a) which defines therein a cavity (10) for housing said radioactive material, and at least one shock absorber (20) which is mounted on the outside of the packaging body,
    the packaging body (1a) having an outer surface (12) provided with at least one first outer surface (12a) and one second outer surface (12b) which are separated by an edge (14) that is covered by said shock absorber (20),
    said shock absorber being characterised in that it includes a metal damping structure comprising:
    a) a first recess (22) passed through by an imaginary straight line (D1) passing via a centre of gravity (G) of the packaging, and via a point (P1) of the edge (14);
    b) a second recess (28) arranged so as to face one of the first and second outer surfaces (12a, 12b); and
    c) a metal wall (30) for absorbing shocks by means of plastic deformation, said wall is at least 5 mm thick and defines the first and second recesses (22, 28) on either side thereof,
    in that the shock absorber (20) has:
    a first part (20a) opposite said first outer surface (12a) of the packaging body (1a);
    a second part (20b) opposite said second outer surface (12b) of the packaging body (1a), the second part being separated from the first part by said first recess (22);
    and in that the shock absorber has, associated with each of said first and second parts (20a, 20b), anti-sliding means enabling, in the event of a fall on the shock absorber (20), said at least one of the first and second parts (20a, 20b) to be held in relation to its associated outer surface (12a, 12b) of the packaging body, in a direction distancing it from the edge (14).

2. Packaging according to claim 1, characterised in that it is designed such that said recesses (22, 28), with the possible exception of the presence of stiffening ribs (60a, 60b), are left empty, and/or that these recesses (22, 28) are filled, at least partially, with a filler material.

3. Packaging according to claim 1, characterised in that the anti-sliding means associated with the first and/or second part (20a, 20b) of the shock absorber extend over a length, according to the direction of the edge (14), representing 70 to 100% of the length of said metal wall (30) along said direction.

4. Packaging according to claim 1, characterised
    in that at least one of said first and second outer surfaces (12a, 12b) of the packaging body (1a) has a level break (40) between two portions (40a, 40b) of this outer surface, said level break being oriented towards said edge (14),
    and in that said part (20a, 20b) of the shock absorber, opposite said outer surface (12a, 12b) including the level break (40), comprises a holding surface (44) for holding the shock absorber, cooperating with said level break (40),
    and in that the level break (40) and the holding surface (44) form said anti-sliding means.

5. Packaging according to claim 4, characterised in that said level break (40) is locally orthogonal to the outer surface (12a, 12b) that it defines, or inclined relative to the normal (42) to this outer surface of the packaging body.

6. Packaging according to claim 1, characterised in that said metal wall (30) is made from steel.

7. Packaging according to claim 1, characterised in that said metal wall (30) is substantially parallel to the edge (14).

8. Packaging according to claim 1, characterised in that at least one of the first and second recesses (22, 28) is passed through by at least one stiffening rib (60a, 60b), connected to said metal wall (30).

9. Packaging according to claim 8, characterised in that the stiffening rib(s) (60a) arranged in the first recess (22) and the stiffening rib(s) (60b) arranged in the second recess (28) are arranged in different planes, preferably in staggered rows.

10. Packaging according to claim 8, characterised in that the stiffening rib(s) (60a) arranged in the first recess (22) and the stiffening rib(s) (60b) arranged in the second recess (28) are arranged substantially orthogonally to the metal wall (30).

11. Packaging according to claim 1, characterised in that it is designed such that said metal wall (30) is not passed through by the imaginary surface (S1) defined by all of the imaginary straight lines passing through the edge (14) and through the centre of gravity (G) of the packaging.

12. Packaging according to claim 1, characterised in that said shock absorber (20) is mounted in a removable manner onto the packaging body (1*a*), for example using shear pins and bolts.

13. Packaging according to claim 1, characterised in that the shock absorber (20) is a protection structure covering one corner (60) of the packaging body (1*a*), defined by at least three convergent edges (14) of the outer surface (12) of this body.

14. Packaging according to claim 13, characterised in that it comprises a plurality of individual shock absorbers (20), each covering one corner (60) of the outer surface (12) of the packaging body (1*a*).

15. Packaging according to claim 1, characterised in that the packaging body (1*a*) has a generally polyhedral shape.

\* \* \* \* \*

UNITED STATES PATENT AND TRADEMARK OFFICE
CERTIFICATE OF CORRECTION

PATENT NO. : 9,928,928 B2
APPLICATION NO. : 15/305842
DATED : March 27, 2018
INVENTOR(S) : Fabien Collin et al.

Page 1 of 1

It is certified that error appears in the above-identified patent and that said Letters Patent is hereby corrected as shown below:

In the Specification

Column 6, Line 16, "51" should be -- S1 --.

Signed and Sealed this
Twelfth Day of June, 2018

Andrei Iancu
*Director of the United States Patent and Trademark Office*